United States Patent
George

(10) Patent No.: US 7,034,901 B2
(45) Date of Patent: Apr. 25, 2006

(54) CONVERGENCE OPTIMIZATION IN A PROJECTION DISPLAY

(75) Inventor: John Barrett George, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 542 days.

(21) Appl. No.: 10/343,295

(22) PCT Filed: Aug. 2, 2001

(86) PCT No.: PCT/US01/24588

§ 371 (c)(1),
(2), (4) Date: Jan. 29, 2003

(87) PCT Pub. No.: WO02/13543

PCT Pub. Date: Feb. 14, 2002

(65) Prior Publication Data

US 2004/0125243 A1   Jul. 1, 2004

Related U.S. Application Data

(60) Provisional application No. 60/223,200, filed on Aug. 4, 2000.

(51) Int. Cl.
*H04N 9/28* (2006.01)
(52) U.S. Cl. ............... 348/807; 348/745; 315/368.18
(58) Field of Classification Search ........ 348/805–807, 348/189, 745–747, 776, 778; 315/368.11, 315/368.18, 368.21, 368.28
See application file for complete search history.

(56) References Cited

U.S. PATENT DOCUMENTS

| | | | | |
|---|---|---|---|---|
| 4,499,457 A | * | 2/1985 | Hintze | 345/22 |
| 4,611,151 A | * | 9/1986 | Hoover et al. | 315/368.18 |
| 4,961,030 A | * | 10/1990 | Ogino et al. | 315/368.23 |
| 5,798,668 A | * | 8/1998 | George | 327/538 |

FOREIGN PATENT DOCUMENTS

| | | |
|---|---|---|
| EP | 743 797 A2 | 11/1996 |
| EP | 932 310 A2 | 7/1999 |

OTHER PUBLICATIONS

Search Report, Copy of International Search Report attached.

* cited by examiner

*Primary Examiner*—Victor R. Kostak
(74) *Attorney, Agent, or Firm*—Joseph S. Tripoli; Harvey D. Fried; Francis A. Davenport

(57) ABSTRACT

A projection display comprises three cathode ray tubes each having a deflection yoke and convergence yoke and each tube generating a raster for projection. One of the three cathode ray tubes has the convergence yoke coupled for current flow in a direction opposite to that of the other two convergence yokes. An amplifier is respectively coupled to each convergence yoke for convergence correction of each raster. A convergence circuit supplies correction signal values that are coupled to each respective amplifier such that convergence correction by the other two convergence yokes is responsive to a difference between the correction signal value coupled to the one convergence yoke and the correction signal values coupled to the other two convergence yokes.

6 Claims, 1 Drawing Sheet

CONVERGENCE OPTIMIZATION IN A PROJECTION DISPLAY

This application claims the benefit under 35 U.S.C. § 365 of International Application PCT/US01/24588 filed Aug. 2, 2001, which claims the benefit of U.S. Provisional Application No. 60/223,200, filed Aug. 4, 2000.

This disclosure relates to the field of digitally generated deflection correction waveforms and in particular to the optimization of setup control and convergence stability.

BACKGROUND OF THE INVENTION

In a projection video display, geometrical raster distortions result from the physical placement of the cathode ray display tubes. Such raster distortions are exacerbated by the use of cathode ray tubes with curved, concave display surfaces and the inherent magnification in the optical projection path. The projected image is composed of three scanning rasters which are required to be in register one with the other on a viewing screen. The precise overlay of the three projected images requires the adjustment of multiple waveforms to compensate for geometrical distortion and facilitate the superimposition of the three projected images. However, manual alignment of multiple waveforms is labor intensive during manufacturing, and without the use of sophisticated test equipment may restrict the complexity of setup undertaken at a user location. Digital convergence in a projection television receiver can be achieved using a two dimensional matrix of adjustable factors applicable to points distributed at regular intervals across the visible screen area. The degree of deflection correction may be finely adjusted at each of these points independently.

In the horizontal direction the deflection correction is determined by a numeric digital factor applicable at the matrix points, which is converted to an analog signal for driving a convergence correction coil. At intermediate points between the points on the matrix, the correction factor is determined by an averaging filter. In the vertical direction it is necessary to calculate the values for the intervening scan lines between the lines corresponding to the points on the correction matrix.

Green is typically chosen to be centered on the projection system optical axis. In this position, the image on the face of the green tube suffers least geometric distortion hence it is chosen as the geometric reference. Red and blue displays are positioned on the axis vertically but typically are located off the optical axis horizontally. As a result, the red and blue rasters are additionally distorted and require keystone shaping to compensate for this off axis projection location. The green raster is sized and shaped by correction waveforms to minimize geometric distortion. The red and blue rasters are then matched to align and precisely overlay the green image. The uncorrected green raster suffers a large vertical pincushion distortion which is corrected by a correction waveform. For optimum geometry, the correction waveform along each column has a distinct S-shape having sinusoidal and parabolic components, and for the off axis red and blue images an additional linear component is required.

The correction waveform may, for example, be adjustable along a matrix of factors defining 13 rows and 16 columns. For each point in the matrix, numerical factors define the associated displacement of the red, green and blue rasters to be effected at each point to achieve accurate picture geometry and superimposition of the red and blue rasters with the green raster. Convergence errors can occur where the red and green and blue images separate horizontally at the center of the display image and, although user centering capability may be provided, such controls can result in more sever mis-convergence at peripheral image locations. The use of cathode ray tubes having concave spherical phosphor surfaces may exacerbate such peripheral image mis-convergence if the individual rasters are not repositioned to their original nominally circumscribed location on the tube face. Hence it is desirable that a user enabled centering control facilitate the simultaneous movement of all rasters.

SUMMARY OF THE INVENTION

A projection display comprises three cathode ray tubes each having a deflection yoke and convergence yoke and each tube generating a raster for projection. One of the three cathode ray tubes has the convergence yoke coupled for current flow in a direction opposite to that of the other two convergence yokes. An amplifier is respectively coupled to each convergence yoke for convergence correction of each raster. A convergence circuit supplies correction signal values that are coupled to each respective amplifier such that convergence correction by the other two convergence yokes is responsive to a difference between the correction signal value coupled to the one convergence yoke and the correction signal values coupled to the other two convergence yokes.

DETAILED DESCRIPTION

Figure 1:
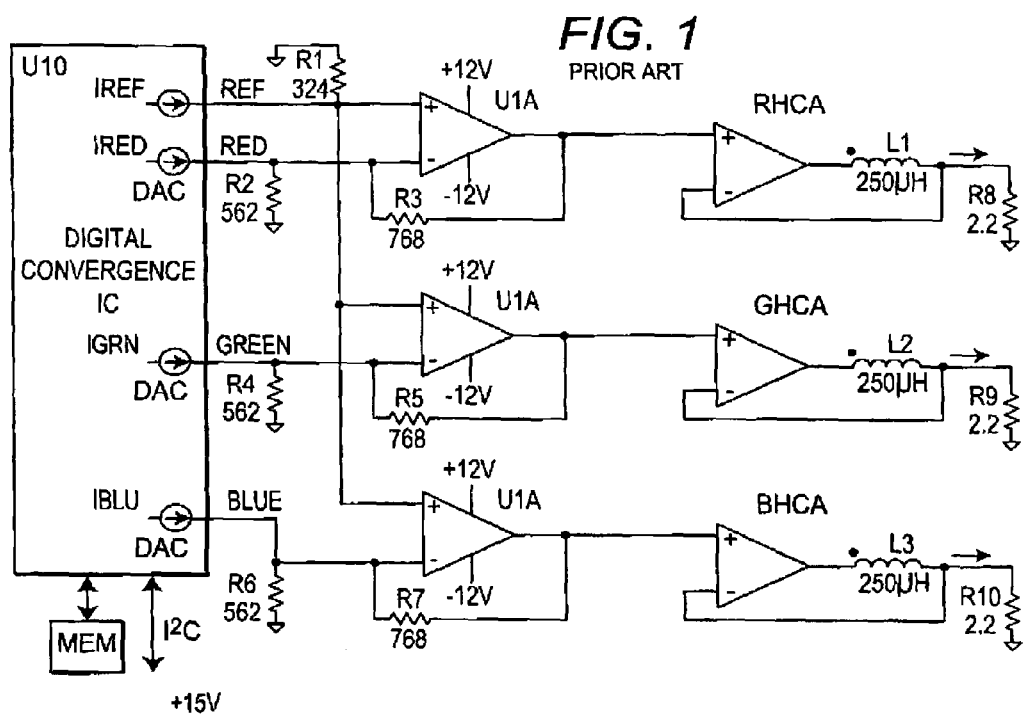
FIG. 1 is a simplified schematic drawing showing horizontal convergence correction circuitry of a projection image display device.

FIG. 1 shows a digital convergence integrated circuit, for example an ST Microelectronics type STV 2040. The digital convergence integrated circuit, (U10) is controlled via a data bus and provides a plurality of functions, but specifically generates deflection correction waveforms from digital values stored in memory (MEM) and representative of the matrix point correction values. Digital convergence integrated circuit, (U10) contains six digital to analog converters or DACs which are employed to generate analog correction waveforms for driving six convergence yoke coils. However, in FIG. 1 only circuitry for correction of horizontal raster distortion is illustrated. The convergence coils are grouped as horizontal and vertical pairs on respective red green and blue cathode ray tubes to provide horizontal and vertical raster correction. Each digital to analog converter is capable of 1024 different levels in a range from 0 to 7 mille Amperes. In addition the digital convergence IC generates and outputs a reference current of 3.5 mille Amperes which is conducted via resistor R1 to generate a reference voltage of approximately 1 volt. Six operational amplifiers receive convergence signals from the DAC outputs, however in FIG. 1 only the horizontal correction circuitry is depicted by amplifiers, U1A, U2A and U3A. The gains for the horizontal correction amplifiers are equal and the values of resistors R2 and R3, R4 and R5 and R6 and R7 are chosen to provide a specific gain and to provide an input impedance which substantially matches the ohmic value of the resistor R1 to minimize offset effects. The operational amplifiers are used to compare the digital to analog converter output current, generated for each channel, with the reference current from U10 applied via resistor R1. The comparison is performed by converting each output DAC current and the reference current to voltages using precision low temperature drift 1% resistors R1, R2, R4 and R6. In response to the maximum current range from the digital to analog converters the six operational amplifiers can generate output voltages in the range +/−2.68 volts. These deflection correction signals are fed to six power amplifiers, however only three amplifiers providing horizontal correction are depicted for red green and blue channels (RHCA, GHCA and BHCA). The six power amplifiers drive correction currents in red green and blue horizontal and vertical convergence yokes and develop corresponding voltages across respective series connected 2.2 ohm current sensing resistors (R8, R9 and R10). The given DAC output current range results in horizontal yoke currents in a range of +/−1.218 Amperes.

Convergence of the projection image display is initiated with the green image where convergence yoke currents are adjusted to minimize or substantially eliminate geometric distortion of the green display image. Following adjustment of green deflection correction the red and blue convergence yoke currents are adjusted to cause the respective red and blue images to precisely overlay the green image. However, it has been observed that convergence drift can occur where the red and green and blue and green images separate horizontally at the center of the displayed image. The cause of this convergence drift is obscure and is believed to result from a plurality of causes. One mechanism is believed to result from an initial aging effect within transistor structures forming the plurality of digital to analog converters within the digital convergence IC and is thought to be related to an accumulation and stabilization of trapped charges within MOS structures of the integrated circuit. The initial variation of these trapped charges is believed to result in different switching thresholds of comparators forming the digital to analog converters. Thus as the comparator switching thresholds change so too does the resultant analog correction signal produced for identical digital input values. Such integrated circuit related convergence drift may be corrected by convergence re-alignment subsequent to the initial test, but this remedial action represents an additional manufacturing cost.

A user adjustment is provided for center convergence to correct for differences in the geomagnetic field between the factory and user location which cause the displayed images to be shifted. Such geomagnetic image shifts are corrected by center convergence controls. However, this adjustment is not suited to the correction of convergence drift resulting from digital to analog converter variation. In addition projection display cathode ray tubes can be employed which have optimized image or optical brightness facilitated by the use of spherical phosphor surfaces which consequently necessitate the restoration of the complete shifted image to the original tube face location rather than shifting only the center region. By repositioning the complete image to the factory aligned position, image distortion is minimized and the factory setup convergence accuracy is restored.

Restoration of the factory aligned position is achieved by adjusting the centering of an internally generated green reference rectangle to position it within the viewing area of the screen. The red and blue images are then aligned with the green image at the center of the screen. However when green and red drift apart at the picture center, this process while correcting errors in center, introduces large red to green horizontal convergence errors near the left or right edges of the screen which are not acceptable.

Figure 2:
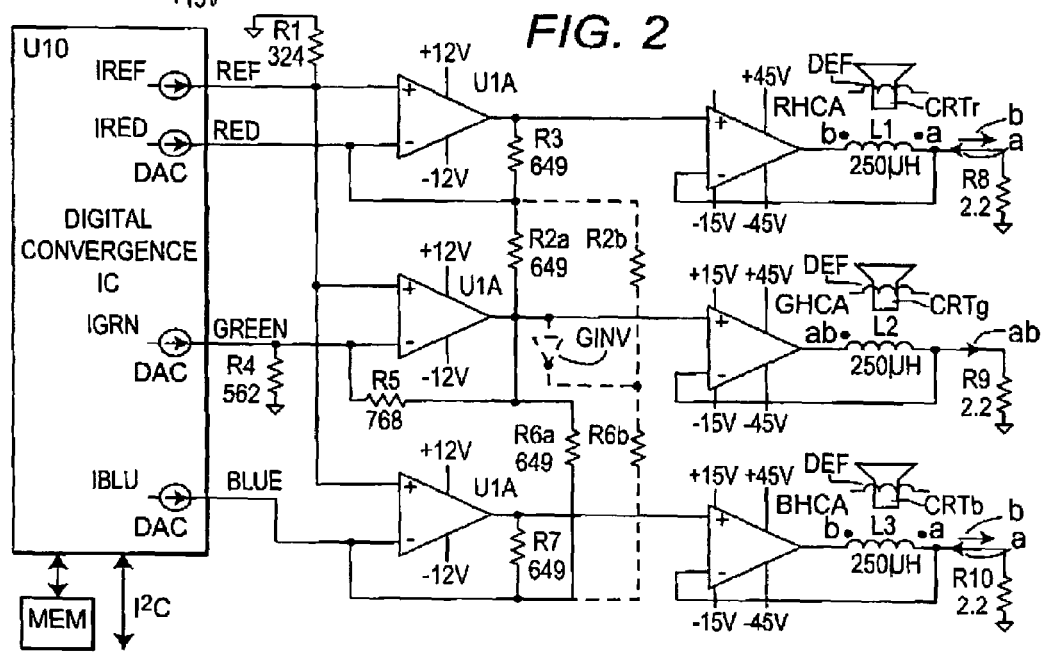
FIG. 2 shows a simplified circuit similar to that of FIG. 1 but including first and second inventive arrangements.

FIG. 2 shows in simplified form, a horizontal deflection correction circuit similar to that of FIG. 1 but including a first and second inventive arrangements. The effects of red to green, and blue to green differential drift may be minimized by taking advantage of the fact that the convergence correction waveforms for red and green are somewhat similar. The red correction signal generated by the red digital to analog converter can be reduced in amplitude if the red correction coil drive signal is formed as a difference from the green correction signal value. The blue correction signal may be similarly processed to form a difference signal from the green correction signal.

Operation of the red and blue correction circuits with difference or differential correction values rather than absolute values can be advantageously achieved in a first inventive arrangement (a) by summing the green operational amplifier (U2A) output signal coupled via resistors R2a and R6a with the respective red and blue DAC signals, IRED, IBLU at the respective inputs of the red and blue operational amplifiers U1A and U3A. The red and blue convergence yokes L1 and L3 are reversed in winding sense or magnetic polarity with respect to the winding or magnetic polarity green convergence yoke L2. The reversed winding sense or magnetic polarity in arrangement (a) is depicted by the placement of a coil polarity dot (a) and the direction of corrective current flow, indicated by the arrow head. In this first inventive arrangement (a) the corrective current in coil L2 is reversed in direction relative to the corrective currents in coils L1, L3. Because the polarity of the red and blue magnetic corrective fields are reversed relative to the corrective field formed by current flow in the green yoke, convergence of the red and blue images with that of the green CRT forces correction signals IRED, IBLU to be inverted or reversed in magnitude relative to polarity of correction signal IGRN. Hence the required red and blue differential corrective signals are advantageously formed by the addition the correction signal IGRN having the opposite polarity. Advantageously in case of drift, any green picture movement, for example as a result of DAC burn in drift, produces substantially identical movement in both the red and blue pictures. There is no drift when red and green have the same correction value and any red to green drift will be proportional to the difference between red and green correction signals.

A second inventive embodiment (b) is shown in FIG. 2 and depicted by circuitry show with a dotted outline. The second embodiment employs an inverting operational amplifier (GINV) which forms an inverted green correction signal for connection to respective red and blue operational amplifiers (U1A and U3A). Inverting amplifier (GINV) receives the green operational amplifier output signal which is inverted and coupled via feedback resistors R2b and R6b to respective red and blue amplifiers. The use of inverting amplifier (GINV) in the green correction signal obviates the requirement of the first embodiment to reverse the corrective magnetic field polarity of the red and blue convergence yokes, as depicted by the common placement of coil polarity dots (b) on coils L1, L2, and L3 and the same sense of corrective current flow as indicated by arrows (b).

Similarly these inventive circuit arrangements can also be used for correction of respective vertical rasters. An additional advantage is the simplification of the user centering controls which allows both red and blue images to move together with the green image. Thus the required user compensation of centering errors or geomagnetic shift is greatly simplified.

What is claimed is:

1. A projection display comprising:

three cathode ray tubes each having a deflection yoke and convergence yoke, each tube generating a raster for projection, one of said three cathode ray tubes having said convergence yoke coupled for current flow in a direction opposite to that of said other two convergence yokes;

an amplifier respectively coupled to each convergence yoke for convergence correction of each raster; and, a convergence circuit supplying correction signal values coupled to each respective amplifier such that convergence correction by said other two convergence yokes is responsive to a difference between the correction signal value coupled to said one convergence yoke and the correction signal values coupled to said other two convergence yokes.

2. The projection display of claim 1, wherein the amplifier coupled said one convergence yoke coupled for opposite direction current flow is coupled to provide a feed back signal to the amplifiers coupled said other two convergence yokes.

3. The projection display of claim 1, wherein said one convergence yoke coupled for opposite direction current flow causes a correction signal and feed back signal having a polarity for generating differential convergence correction by said other two convergence yokes.

4. The projection display of claim 1, wherein said one convergence yoke coupled for opposite direction current flow is mounted on a cathode ray tube forming a green monochrome raster.

5. The projection display of claim 1, wherein a correction signal value coupled to said one convergence yoke coupled for opposite direction current flow provides movement of each raster formed by said other two convergence yokes.

6. A projection video image display comprising:

three cathode ray tubes each having a yoke arrangement for horizontal and vertical deflection and generating a raster for projection on a display screen;

convergence coils mounted on each of said cathode ray tubes and each convergence coil coupled to recieve an amplified convergence correction signal output from a corresponding first amplifier, a second amplifier recieving a output of only one of said first amplifiers and forming at an output of said second amplifier an inverted correction signal for coupling to respective inputs of the two other first amplifiers; and, a convergence circuit coupled to each respective first amplifier and supplying convergence correction signals specific to each respective cathode ray tube to correct errors in said rasters, and said two other first amplifiers and respective convergence coils correcting errors in each respective raster responsive to a combination of said convergence circuit specific correction signal and said inverted correction signal coupled from said one of said first amplifiers.

* * * * *